(12) United States Patent
Kawamura et al.

(10) Patent No.: US 6,559,931 B2
(45) Date of Patent: May 6, 2003

(54) THREE-DIMENSIONAL (3-D) COORDINATE MEASURING METHOD, 3-D COORDINATE MEASURING APPARATUS, AND LARGE-STRUCTURE BUILDING METHOD

(75) Inventors: Tsutomu Kawamura, Tokyo (JP); Mitsuaki Uesugi, Tokyo (JP); Hirohiko Yanagita, Tsu (JP); Noboru Kawasaki, Tsu (JP); Hisashi Ito, Tsu (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 10/251,879

(22) Filed: Sep. 20, 2002

(65) Prior Publication Data

US 2003/0048438 A1 Mar. 13, 2003

Related U.S. Application Data

(63) Continuation of application No. PCT/JP01/08746, filed on Oct. 4, 2001.

(30) Foreign Application Priority Data

Feb. 8, 2001 (JP) ........................................ 2001-032602

(51) Int. Cl.[7] ........................... G01C 3/08; G01B 11/26; G01B 11/14; G06K 9/36
(52) U.S. Cl. ....................... 356/4.01; 348/135; 348/141; 356/141.1; 356/625; 382/286; 702/159; 702/172
(58) Field of Search .................................. 702/159, 172; 356/141.1, 625, 4.01; 348/135, 141; 382/286

(56) References Cited

U.S. PATENT DOCUMENTS

| | | |
|---|---|---|
| 6,023,326 A | 2/2000 | Katayama et al. |
| 6,031,606 A | 2/2000 | Bayer et al. |

FOREIGN PATENT DOCUMENTS

| | | |
|---|---|---|
| GB | 2 353 862 A | 3/2001 |
| JP | 63-28269 B2 | 6/1988 |
| JP | 8-136218 A | 5/1996 |
| JP | 8-254409 A | 10/1996 |
| JP | 9-14921 A | 1/1997 |
| JP | 10-19562 A | 1/1998 |
| JP | 2916687 B2 | 4/1999 |
| JP | 11351870 A | 12/1999 |
| JP | 2000-055660 A | 2/2000 |
| JP | 2000-329533 A | 11/2000 |
| JP | 2001-4377 A | 1/2001 |

OTHER PUBLICATIONS

H. Arita et al; An Ellipse Figure Recognition in Gray Image Data and 3D–Coordinate Measurement for Transit Automated Cellimating; 1997 SICE; vol. 34, No. 6, pp. 470–478.

*Primary Examiner*—Stephen C. Buczinski
(74) *Attorney, Agent, or Firm*—Frishauf, Holtz, Goodman & Chick, P.C.

(57) ABSTRACT

A 3-D coordinate measurement is performed in such a way that an electrooptical distance-measuring device is used to measure a linear distance to a target point set on a surface of a measurement object, an angle measuring device is used to measure shifted angles of an optical axis of the electrooptical distance-measuring device, and a 3-D coordinate of the target point is measured according to a measured distance and a measured angle after the optical axis of the electrooptical distance-measuring device has been aligned to the target point. The present method includes a coordinate recognizing step for observing a plurality of targets, recognizing a plurality of target points, and calculating approximate 3-D coordinates of the target points; a macroscopic sighting step for approximate aligning the optical axis of the electrooptical distance-measuring device; and a microscopic sighting step for aligning the optical axis of the electrooptical distance-measuring device to the one of the target points in the predetermined viewfield range.

24 Claims, 11 Drawing Sheets

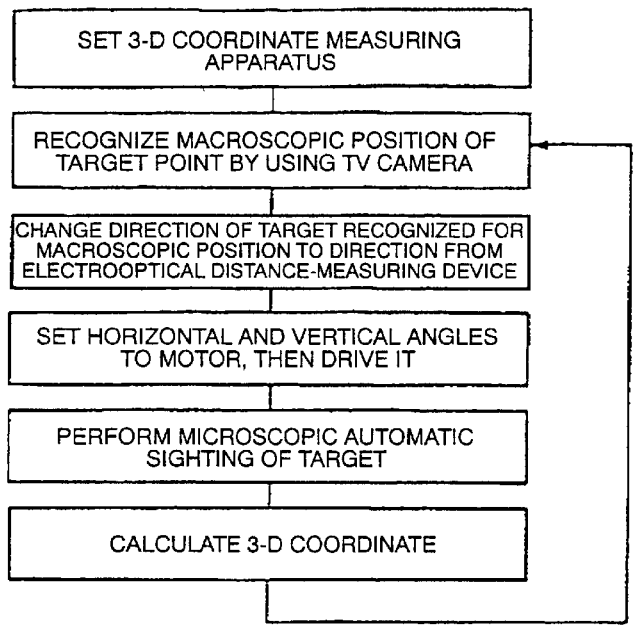
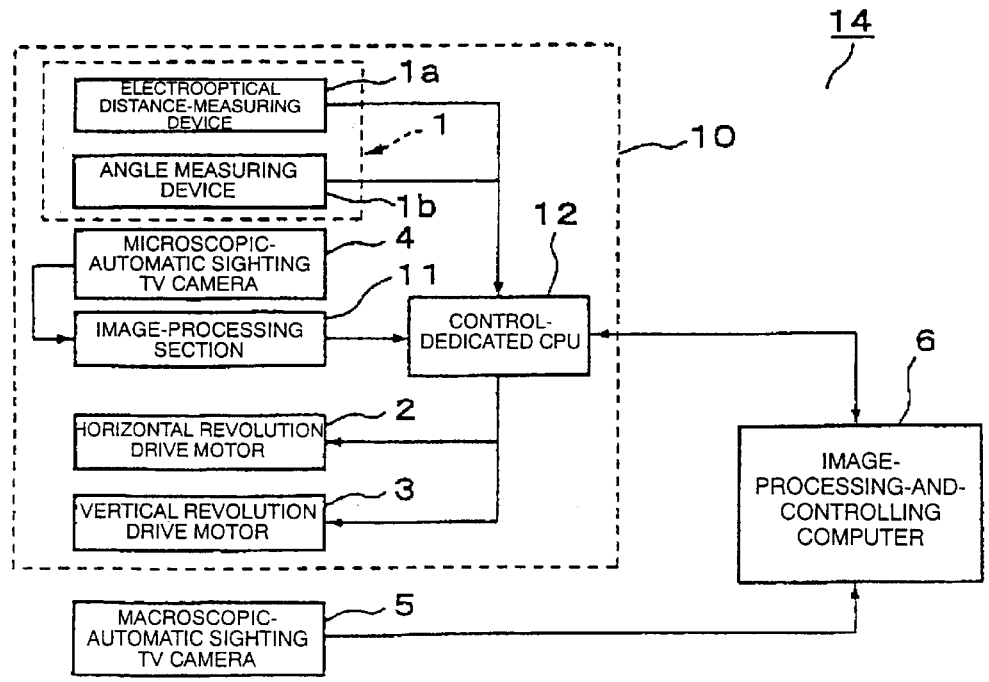

FIG. 15
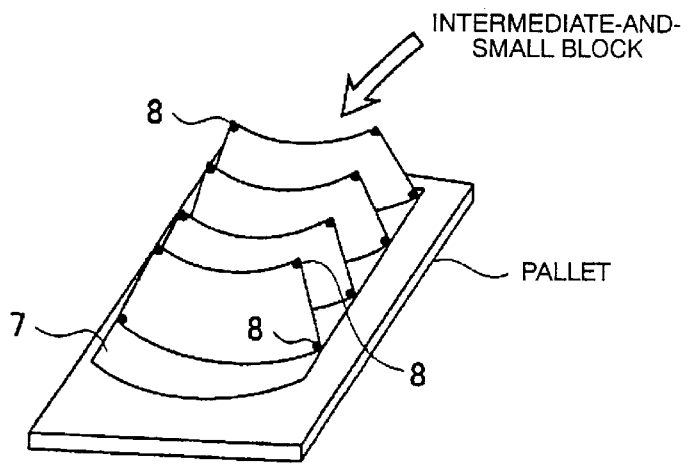
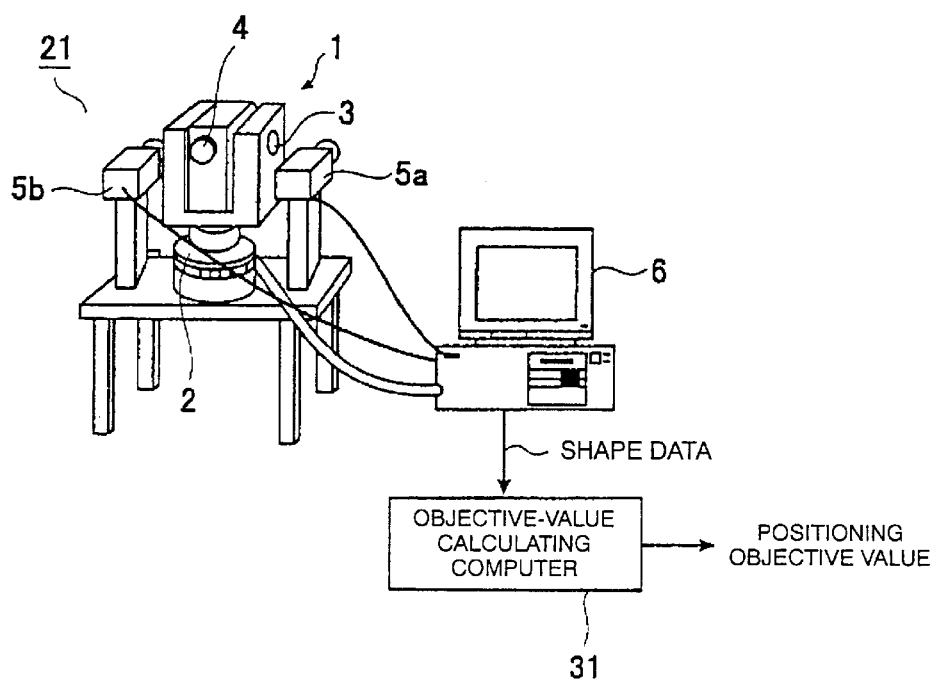

THREE-DIMENSIONAL (3-D) COORDINATE MEASURING METHOD, 3-D COORDINATE MEASURING APPARATUS, AND LARGE-STRUCTURE BUILDING METHOD

This application is a continuation application of International Application PCT/JP01/08746 (not published in English) filed Oct. 4, 2001.

BACKGROUND OF THE INVENTION

1. Field of the Invention

The present invention relates to a three-dimensional (3-D) coordinate measuring method and a 3-D coordinate measuring apparatus for measuring 3-D coordinates of large structures, such as ships, bridges, civil works, buildings, and components therefor. In addition, the present invention relates to a building method employing the aforementioned 3-D coordinate measuring method and apparatus.

2. Description of Related Arts

Generally, a two-dimensional (2-D) measuring apparatus using, for example, a transit, a measuring tape, and a plumb bob, is employed to measure large structures such as ships, bridges, civil works, and buildings. In recent years, however, such measurement is carried out using a trigonometrical survey developed in the field of measurement. Also used for the measurement is a 3-D measuring apparatus that includes a measuring apparatus with an electrooptical distance-measuring device according to distance-measuring and angle-measuring schemes.

For example, a brand "MONMOS" is commercially marketed by Sokkia Co., Ltd. This brand is a 3-D coordinate measuring system in which an arbitrary point of a measurement target object (or, a measurement target substance) can be measured with a single measuring apparatus. In this system, arbitrary two points are preliminarily measured, and a 3-D coordinate system is set according to the measurement result. Thereafter, reflecting targets (including target points) provided at the individual measuring points are sighted to synchronously measure the three elements, i.e., the horizontal angle, the vertical angle, and the distance. Then, the system performs a coordinate system transformation including analysis and calculations, and obtains a 3-D coordinate according to the transformation. The system is capable of achieving a high-precision measurement with an error of ±1 mm or less per distance of 100 m. The target point is provided on a reflection plane, and is used as a measurement point in the 3-D coordinate measurement. A reflecting target has a specific thickness. As such, predetermined calculations need to be performed according to measurement values and the size and shape of the reflecting target to obtain accurate 3-D coordinates of the target object.

However, conventional measuring systems including the "MONMOS" require use of the human eye to perform, for example, telescope focusing operation and alignment operation between the center (target point) of a reflecting target and cross lines of the telescope in sighting operation. As such, time-consuming complex operations need to be performed, and human errors of a measuring person tend to be included in measurement results. That is, required human operations causes deterioration in, for example, the efficiency and the precision of the measurement. The aforementioned sighting operation refers to the operation of aligning an optical axis of a distance-measuring device to a measurement point projected in a viewfield of, for example, a telescope or magnifying display means for a captured image.

To overcome the above-described problems, there are commercially marketed measurement systems including functions of automating human-eye dependent sighting operation. For example, a brand "TCA1100" series is marketed by Leica Geosystems Corp., and a brand "CYBER MONMOS" is marketed by Sokkia Co., Ltd. Either of the systems includes image capturing means, such as a CCD camera, provided concentric with the optical axis of an electrooptical distance-measuring device. The system is so designed as to detect a central position of a reflecting target from an image captured by the image capturing means. Then, the system performs calculations and thereby obtains the amount of deviation between a central position of the image capturing means and the central position of the reflecting target. When the system finds the positions misaligned, it controls a motor to drive an angle measuring device by an amount corresponding to the amount of the deviation, and aligns the positions with each other. The system of the aforementioned type executes automatic sighting (automatic microscopic sighting) within a relatively narrow viewfield of the image capturing means. In this view, the system can be included in a type that has a microscopic automatic sighting means.

In addition, in the aforementioned system, conditions for the positions of reflecting targets and the measurement sequence thereof are initialized. Thereafter, reflecting targets captured by the image capturing means are extracted by an image processor. Subsequently, the horizontal angle and the vertical angle of the image capturing means are adjusted using a servomotor to align the center of each of the reflecting targets with the optical axis of the image capturing means. In this manner, the measurement is implemented. In this case, the reflecting targets need to be included into the viewfield of the image capturing means. As such, difficulties arise in that the plurality of measurement points (target points) in a wide range are automatically sighted. As such, with this system, when a coordinate of the position of a reflecting target is memorized, an operator needs to directly input the coordinate of the position of the reflecting target from a measurement apparatus according to design data. In contrast, when a coordinate of the position of a reflecting target is not yet memorized, the operator needs to direct the image capturing means manually or by using a controller toward the reflecting target to carry out teaching for the system.

Other methods of performing automatic measurement are proposed under, for example, Japanese Unexamined Patent Application Publications No. 8-136218 and No. 9-14921. In the proposed methods, an analysis-dedicated computer is used to transform the position of a reflecting target into a coordinate from a measuring apparatus. Thereby, the sight direction is determined, and automatic measurement is performed.

However, the methods of the above-described type have problems described below.

When a 3-D coordinate of reflecting targets is not yet memorized, teaching needs to be carried out in the way that a CCD camera is directed to individual measuring points, and the operation of including the individual measuring points into a monitor screen is iterated. Thus, since complex human operations are involved, advantages in automation cannot be expected.

Even when 3-D coordinates of reflecting targets are already memorized to the system, although an analysis-dedicated computer is used to transform the coordinate system, time-consuming human operations are required.

That is, the method still requires the operation of aligning a design coordinate system and a measurement coordinate system to be performed in the initialization in the way of measuring at least two points of a reflecting target used for reference.

Moreover, although there are cases in which the method is used to position component members in assembly work, the method requires a relatively long time for measurement. In most cases of assembly work, component members are located in positions deviating from the viewfield of the image capturing means. As such, even when the position of a reflecting target is calculated from design values, since the reflecting target is not found in the viewfield, and a reflecting target needs to be searched from the outside of the viewfield. Consequently, it takes a relatively long time for measurement.

Since the performance of the conventional 3-D coordinate measuring method is as described above, it is difficult to directly use the method in assembly work, for example, shipbuilding assembly work.

Recently, most of shipbuilding methods employ a block-based fabrication method. As shown in FIG. 17, in a shipbuilding method, first, processes such as cutting and hot bending are performed for steel plates (material-processing step). Then, processed steel plates are welded and assembled, and intermediate-and-small blocks are thereby fabricated (a step of the above processing will be referred to as an intermediate-and-small block fabricating step). Intermediate-and-small blocks individually fabricated as described above are assembled and welded together, and a large block (which hereinbelow will be referred to as a 3-D block) is thereby fabricated (a step of the above processing hereinbelow will be referred to as a large-assembly fabricating step or a large-block fabrication step). Large blocks individually fabricated as described above are assembled together in a dock (a step of the above processing hereinbelow will be referred to as an intradock assembly step). Thereby, a hull is finally fabricated.

In the above-described shipbuilding method, when the precision in the assembly of the intermediate-and-small block or the large block is low, correction needs to be performed in a subsequently step. "Correction" in this case refers to a series of the following processes. When the shapes of two blocks to be assembled together do not match, a portion of welded steel plates or members in one or two of the blocks is removed though, for example, gas-cutting, correction is performed to so that the shapes of the two blocks to the shapes of the two blocks are matched, and the removed portion of the steel plates or the member is attached again.

In the shipbuilding process, attaching and welding processes of the steel plate and blocks largely account for the man-hour ratio. As such, an important key for improving the productivity is how to improve the processing efficiency. However, according to the conventional techniques, since the shape precision is only in a range of several tens millimeters, many events requiring the correction have occurred, thereby hindering improvement in the processing efficiency. In addition, defects in the precision of the blocks accumulate as the material-processing step proceeds. Accordingly, when an event requiring the correction occurs at a final intradock assembly step, the correction requires several times the work time required for the corrections event in the previous step, thereby greatly influencing the productivity. Thus, the improvement in the productivity in the shipbuilding process greatly depends on the improvement in the block-shape precision management level in the intermediate-and-small block fabricating step and the large-block fabrication step. According to the improvement in the block-shape precision from a level of several tens millimeters to a level of several millimeters, the overall man-hours for attaching and welding including correction is estimated reducible by several tens percent.

Conventionally, there are other cases in which shape measurement was attempted during an assembly step to improve the precision in the block shape precision. However, according to the conventional 3-D coordinate measuring methods, it takes excessive time to carry out the measurement, and an excessive measurement load therefore occurs. As such, the method is not better than a trial method; that is, the method is not as yet practical.

SUMMARY OF THE INVENTION

The present invention has bee developed in consideration of the above-described situations. Accordingly, an object of the invention is to provide a three-dimensional (3-D) coordinate measuring method and a 3-D coordinate measuring apparatus that almost do not require human operations and that are capable of implementing high-speed, high-precision, and substantially automatic measurement of 3-D coordinates even for a large structure even when the coordinates and the like of the positions of reflecting targets are not yet memorized.

Another object of the invention is to provide a large-structure building method that almost does not require human operations, that is capable of implementing high-speed and high-precision automatic measurement of the positions of a plurality of reflecting targets mounted to component members, and that is capable of implementing high-efficiency and high-precision assembly of the component members by using the results of the measurement.

In order to achieve one of the objects, according to one aspect of the invention, the invention provides a three-dimensional (3-D) coordinate measuring method is provided wherein an electrooptical distance-measuring device is used to measure a linear distance to a coordinate-measurement target point set on a surface of a measurement target object, an angle measuring device is used to measure shifted angles of an optical axis of the electrooptical distance-measuring device, and a 3-D coordinate of the target point is measured according to a measured distance and a measured angle after the optical axis of the electrooptical distance-measuring device has been aligned to the target point set on the surface of the measurement target object. The three-dimensional (3-D) coordinate measuring method includes a coordinate recognizing step for observing a plurality of targets on the overall surface of the measurement target object through an image capturing means, recognizing a plurality of target points on the surface of the measurement by processing obtained images, and calculating approximate 3-D coordinates of the target points; a macroscopic sighting step for approximate aligning the optical axis of the electrooptical distance-measuring device so that one of the target points recognized by the coordinate recognizing step is included into a predetermined viewfield range; and a microscopic sighting step for aligning the optical axis of the electrooptical distance-measuring device, which has been approximately aligned at the macroscopic sighting step, to the one of the target points in the predetermined viewfield range.

According to another aspect of the invention, to implement the above-described method, a 3-D coordinate measuring apparatus is provided that includes an electrooptical distance-measuring device for measuring a linear distance to a coordinate-measurement target point set on a surface of a measurement target object; an optical-axis driving mechanism to which the electrooptical distance-measuring device is mounted and that rotates on two different axes as the centers to cause the direction of an optical axis of the electrooptical distance-measuring device to be variable along a horizontal direction and a vertical direction; an optical-axis-angle measuring device for measuring the optical-axis angle of the electrooptical distance-measuring device; a microscopic automatic sighting mechanism for using the optical-axis driving mechanism to align the optical axis of the electrooptical distance-measuring device to the target point in a predetermined viewfield for one target point on the surface of the measurement target object; an image capturing mechanism for observing a plurality of targets set on the overall surface of the measurement target object; a macroscopic-position recognizing means for processing an image obtained by the image capturing mechanism, thereby recognizing a plurality of target points on the surface of the measurement target object, and calculating approximate 3-D coordinates of the target points; a macroscopic automatic sighting mechanism for approximately aligning the optical axis of the electrooptical distance-measuring device so that one of the target points recognized by the macroscopic-position recognizing means is included into the predetermined viewfield; sight control means for using the macroscopic automatic sighting mechanism to align the optical axis to a target point, which has been approximately aligned into the predetermined viewfield of the electrooptical distance-measuring device, of the one target set on the measurement target object and that has been recognized by the macroscopic automatic sighting mechanism; and coordinate calculating means for calculating a 3-D coordinate of the target point by using the results of measurement performed by the electrooptical distance-measuring device and the optical-axis-angle measuring means.

According to still another aspect of the invention, a large-structure building method is provided wherein a plurality of first component members of one or more types are assembled, and a second component member is thereby fabricated; a plurality of the second component members of one or more types are assembled, and a third component member is thereby fabricated; similarly, a plurality of n-th component members of one or more types are assembled, and an (n+1)-th component member are thereby fabricated; and one of an intermediate structure and a final structure is thereby fabricated. The large-structure building method includes a measuring step for automatically measuring real shapes of the n-th component members in a manner that calculating individual 3-D coordinates corresponding to a plurality of coordinate-measurement target points set on the n-th component members are calculated according to distance measurement values of an electrooptical distance-measuring device and information on the angle of an optical axis of the electrooptical distance-measuring device; an evaluating step that evaluates assembly precision of the (n+1)-th component member according to the real shape measured at the measuring step and that issues an instruction for use of only n-th component members usable for assembly of the (n+1)-th component member; a coordinate recognizing step that uses image capturing means to observe targets including a plurality of target points set on the n-th component member and that processes obtained images and thereby recognizes approximate 3-D coordinates corresponding to the plurality of target points set on the n-th component member, the coordinate recognizing step being performed to enable the measuring step to obtain the distance measurement values of the electrooptical distance-measuring device and information on the angle of the optical axis of the electrooptical distance-measuring device; a macroscopic sighting step for approximate aligning the optical axis of the electrooptical distance-measuring device by using the approximate 3-D coordinates so that certain one of the target points recognized by the coordinate recognizing step is included into a predetermined viewfield range; a microscopic sighting step for aligning the optical axis of the electrooptical distance-measuring device, which has been approximately aligned at the macroscopic sighting step, to the certain one of the target points in the predetermined viewfield range; and a step of repeatedly performing the macroscopic sighting step and the microscopic sighting step until the distance measurement value of the electrooptical distance-measuring device and information on the angle of the optical axis of the electrooptical distance-measuring device are obtained for all the target points.

BRIEF DESCRIPTION OF THE DRAWINGS

FIG. 5 is a flowchart of a 3-D coordinate measuring procedure according to the first embodiment;

FIG. 6 is a block diagram of a configuration using a measuring mechanism capable of microscopic automatic sighting according to the first embodiment;

FIG. 15 shows a state where an intermediate-and-small block is measured for precision, and construction simulation is performed;

DETAILED DESCRIPTION OF THE INVENTION

Figure 1:
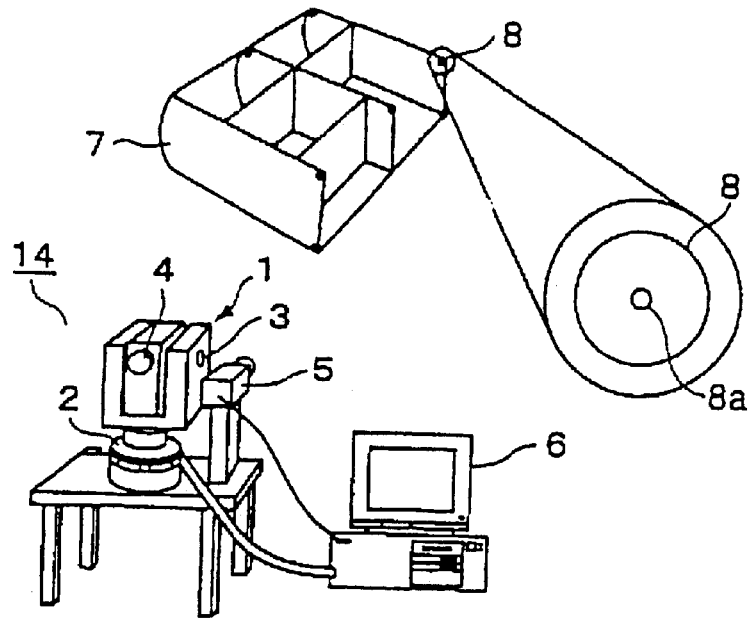
FIG. 1 shows an outline configuration of a large-structure 3-D coordinate measuring apparatus according to a first embodiment.

Features of the present invention include that a measurement target object is widely captured, individual approximate coordinates of a plurality of targets are calculated at one time, and the approximate coordinates are used to sequentially execute macro automatic sighting with respect to individual target points. The macro automatic sighting in this Specification refers to an operation of closing the optical axis of an electrooptical distance-measuring device to a position where a microscopic automatic sighting by microscopic automatic sighting means is executable.

More specifically, according to the present invention, a plurality of targets on a surface of a measurement target object are captured from one direction or at least two directions. Subsequently, captured images are processed, the plurality of targets on the surface of a measurement target object are recognized, and macro coordinates can thereby be calculated. Subsequently, according to the recognition result, macro automatic sighting macro is performed such that the optical axis of the electrooptical distance-measuring device is directed to one or a plurality of the targets, and is aligned to a viewfield range of the microscopic automatic sighting. Subsequently, the microscopic automatic sighting is performed that aligns the optical axis of the electrooptical distance-measuring device to the center of the target (target point). As such, even when the position of the target is not yet memorized, the invention is capable of implementing automatic sighting substantially not requiring human operations. Consequently, coordinates of the positions of the plurality of target points set on the measurement target object and the overall shape of the measurement target object can be measured at high speed substantially in an unmanned condition. Furthermore, also for a large structure, 3-D coordinates thereof can be accurately and substantially automatically measured at high speed.

The present invention can be carried out according to the following preferable embodiments:

(1) An embodiment in which a macro sighting step and a microscopic sighting step are iterated to automatically measuring all the 3-D coordinates of individual target points recognized by a coordinate-recognizing step.

(2) An embodiment in which image capturing means is formed of one or more image capturing devices including at least an image capturing device having the optical axis unaligned with the optical axis of the electrooptical distance-measuring device.

(3) An embodiment in which a plurality of targets on the overall surface of measurement target object are observed from at least two directions.

(4) An embodiment in which a coordinate recognizing step recognizes a plurality of targets on the surface of a measurement target object by using two or more images captured by two or more image capturing devices and according to a trigonometrical survey. Then, the step performs calculations of approximate 3-D coordinates of the targets.

(5) An embodiment in which a coordinate recognizing step uses stereoscopic 3-D visions in a trigonometrical survey.

(First Embodiment)

Figure 2:
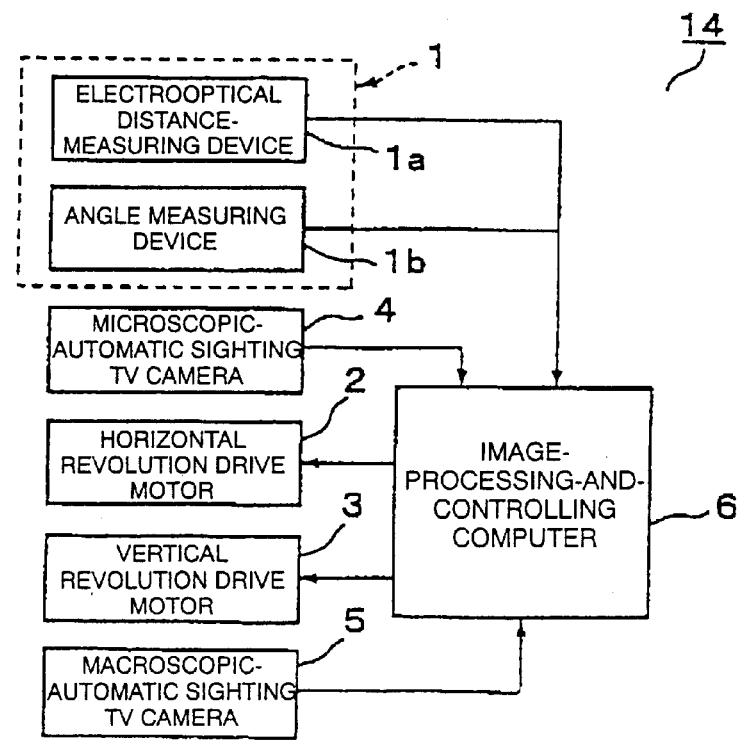
FIG. 2 is a block diagram showing a basic configuration of the 3-D coordinate measuring apparatus shown in FIG. 1.

FIG. 1 shows an outline configuration of a large-structure 3-D coordinate measuring apparatus according to a first embodiment. FIG. 2 is a block diagram showing a basic configuration of the 3-D coordinate measuring apparatus shown in FIG. 1.

Referring to FIG. 1, numeral 1 denotes a distance-measuring angle measuring device. Numeral 2 denotes a horizontal revolution drive motor provided as optical-axis driving means. Numeral 3 denotes a vertical revolution drive motor provided as optical-axis driving means. Numeral 4 denotes a microscopic-automatic sighting TV camera disposed coaxial with an electrooptical distance-measuring device described below. Numeral 5 denotes a macroscopic-position recognizing TV camera provided as macroscopic-position recognizing means having a viewfield including a measurement target object 7 overall. Numeral 6 denotes an image-processing-and-controlling personal computer provided as 3-D coordinate measuring means. Numeral 7 denotes the measurement target object, as mentioned above. Numeral 8 denotes a target set at a target point on the surface of the measurement target object 7. Numeral 14 denotes a 3-D coordinate measuring apparatus 14.

Referring to FIG. 2, the distance-measuring angle measuring device 1 is configured to include an electrooptical distance-measuring device 1a and an angle measuring device 1b. The electrooptical distance-measuring device 1a is capable of measuring the linear distance to a target point 8a set onto the surface of the measurement target object 7. The angle measuring device 1b measures the horizontal angle and the vertical angle of the optical axis of the electrooptical distance-measuring device 1a. The optical axis of the electrooptical distance-measuring device 1a can arbitrarily be displaced by the horizontal and vertical revolution drive motors 2 and 3 in two directions of horizontal and vertical axes. Concurrently, the electrooptical distance-measuring device 1a is driven according to an angle specification received from the image-processing-and-controlling personal computer 6. The target 8, which is disposed at the measurement of the surface of the measurement target object 7, is formed of a reflecting prism or a reflecting sheet. The target 8 reflects a light wave emitted from an illumination source (not shown) set in the 3-D coordinate measuring apparatus 14.

The reflecting prism or the reflecting sheet has a diameter in a range of from 25 to 100 mm (about 50 mm in many cases). In this Specification, the target point 8a is located at a central point (in a range of from 0.5 to 1.0 mm) of the reflecting prism or the reflecting sheet.

The microscopic-automatic sighting TV camera 4 has a viewing angle of, for example, 1.5 degrees allowing one target point 8a to be included in the viewfield. The TV camera 4 outputs a video signal representing the target point 8a (captured) to the image-processing-and-controlling personal computer 6. In the image-processing-and-controlling personal computer 6, the central position of the target 8 is calculated through image processing. In addition, the amounts of revolution of the motors 2 and 3 are calculated to obtain a value necessary for eliminating deviation between the center of the viewfield of the microscopic-automatic sighting TV camera 4, which is coaxial with the electrooptical distance-measuring device 1a, and the center of the target 8. The obtained values are individually set to the motors 2 and 3, and microscopic automatic sighting is performed to align the center of the target 8 with the optical axis of the electrooptical distance-measuring device 1a.

The macroscopic-position recognizing TV camera 5 is preset to have a viewfield that enables a plurality of targets 8 set on the overall surface of the measurement target object 7 to be observed. An image captured by the single macroscopic-position recognizing TV camera 5 is output to the image-processing-and-controlling personal computer 6.

The image-processing-and-controlling personal computer 6 performs the image processing according to the input image, and calculates the positions of the target points 8a in the image captured by the macroscopic-position recognizing TV camera 5. In this manner, the personal computer 6 performs macroscopic-position recognition. The relative positions in the optical axes of the macroscopic-position recognizing TV camera 5, which has the viewfield including the overall measurement target object 7, and the electrooptical distance-measuring device 1a are preliminarily obtained at the time of fabrication. This enables the horizontal angle and vertical angle with respect to the linear line extending from the electrooptical distance-measuring device 1a to be calculated according to the position of the target point 8a detected by the macroscopic-position recognizing TV camera 5. In addition, using the image-processing-and-controlling personal computer 6, the calculated horizontal angle and vertical angle with respect to the respective target point 8a is set to the driving motors 2 and 3. Thereby, the electrooptical distance-measuring device 1a can be directed toward the target point 8a, and the single target point 8a can be included into the viewfield of the microscopic-automatic sighting TV camera 4.

After the inclusion of the single target point 8a into the viewfield of the microscopic-automatic sighting TV camera 4, microscopic automatic sighting is carried out to align the center of the target 8 to the optical axis of the electrooptical distance-measuring device 1a. Subsequent to the alignment, the electrooptical distance-measuring device 1a measures the linear distance to the target point 8a. Concurrently, the angle measuring device 1b measures the horizontal angle and the vertical angle of the electrooptical distance-measuring device 1a. In this manner, the 3-D position of the target point 8a is automatically measured.

Hereinbelow, referring to FIG. 3, a description will be provided regarding a method of calculating the horizontal angle and the vertical angle with respect to the linear line extending from the electrooptical distance-measuring device 1a to the target point 8a according to the position of the target 8 recognized by the macroscopic-position recognizing TV camera 5, which includes the overall measurement target object 7 into the viewfield. In the vertical direction, the optical axis of the macroscopic-position recognizing TV camera 5 is set in the horizontal direction at the same height with respect to the center of the rotational axis of the electrooptical distance-measuring device 1a. Concurrently, in the horizontal direction, the optical axis of the macroscopic-position recognizing TV camera 5 is set parallel to a horizontal-rotation reference axis at the position spaced away by a distance d with respect to the center of the rotational axis of the electrooptical distance-measuring device 1a. Moreover, the TV camera 5 is set and fixed not to be angularly changed by the motors 2 and 3.

Thus, since the vertical heights are the same, the vertical angle with respect to the linear line extending from the electrooptical distance-measuring device 1a to the target point 8a may be remained as the horizontal angle of the target point 8a in the macroscopic-position recognizing TV camera 5. As such, only the horizontal angle needs to be changed after the angle has been detected from the macroscopic-position recognizing TV camera 5.

Figure 3:
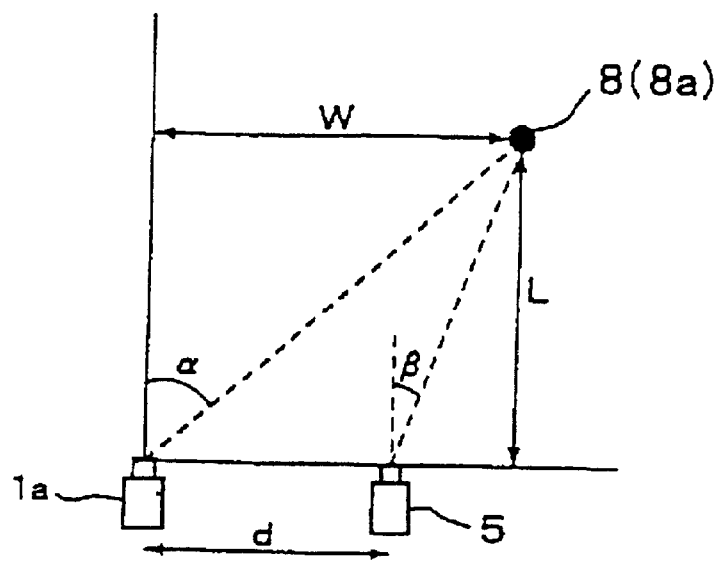
FIG. 3 shows the relationship between a horizontal angle of a target point detected by a macroscopic automatic sighting TV camera and a horizontal angle with respect to a linear line extending from an electrooptical distance-measuring device to the target point.

As shown in FIG. 3, when the target point 8a exists in a position W in the horizontal direction at a distance L from the electrooptical distance-measuring device 1a, a horizontal angle α with respect to the linear line extending from the electrooptical distance-measuring device 1a and a horizontal angle β within the viewfield of the macroscopic-position recognizing TV camera 5 are expressed by the following Formulas (1) and (2):

$$\tan(\alpha) = W/L \tag{1}$$

$$\tan(\beta) = (W-d)/L \tag{2}$$

Accordingly, α is expressed by the following Formula (3) from the Formulas (1) and (2):

$$\alpha = \tan^{-1}[\tan(\beta) + d/L] \tag{3}$$

Figure 4:
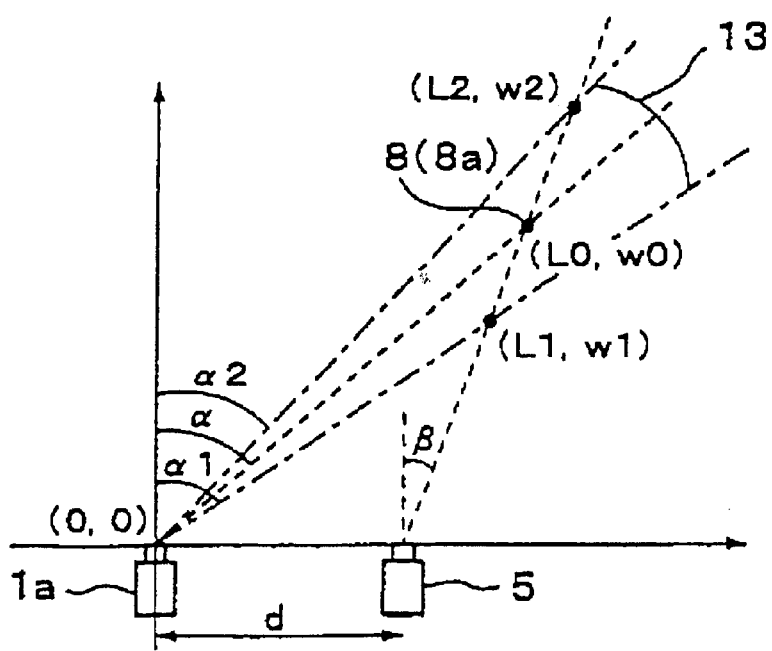
FIG. 4 shows an error range in a horizontal angle of a target point detected by a macroscopic-automatic sighting TV camera and a horizontal angle in the distance from an electrooptical distance-measuring device to the target point.

However, L in the Formula (3) represents an unknown value that cannot be obtained through measurement. For this reason, in the present embodiment, as shown in FIG. 4, α is obtained from Formula (4) (shown below) by assigning to the Formula (3) a shortest distance L1 to a target point 8a located closest to the measurement target object 7 and the electrooptical distance-measuring device 1a and an intermediate value L0 of a longest distance L2 to a target point 8a located farthest thereto.

The real distance to the target point 8a is variable in the range of the shortest distance L1 to the measurement target object 7 and the longest distance L2 thereto. As such, as shown in FIG. 4, there occurs an angle error 13 that is substantially equivalent to the range of the viewfield of the microscopic-automatic sighting TV camera 4. An error Δα from the angle calculated with the intermediate value L0 of the target point 8a is expressed by Formulas (7) and (8) obtained from the Formula (5) and (6) shown below.

$$\alpha = \tan^{-1}[\tan(\beta) + d/L0] \tag{4}$$

$$\alpha 1 = \tan^{-1}[\tan(\beta) + d/L1] \tag{5}$$

$$\alpha 2 = \tan^{-1}[\tan(\beta) + d/L2] \tag{6}$$

$$\tan(\alpha) - \tan(\alpha 2) = \tan(\alpha 2 + \Delta \alpha 2) - \tan(\alpha 2) = d(1/L0 - 1/L2) \tag{7}$$

$$\tan(\alpha 1) - \tan(\alpha) = \tan(\alpha 1) - \tan(\alpha 1 + \Delta \alpha 1) = d(1/L1 - 1/L0) \tag{8}$$

Based on the size of the measurement target object 7, suppose the distance d between the electrooptical distance-measuring device 1a and the macroscopic-position recognizing TV camera 5 is assumed as 150 mm when L1=10 m and L2=30 m. In this case, error-representing maximum values when α, α1, and α2 have individually assumed all arbitrary angles are obtained as: Δα1=0.43 degrees; and Δα2=0.15 degrees. Accordingly, when the viewing angle of the microscopic-automatic sighting TV camera 4 is, for example, 1.5 degrees or smaller, angular errors can be converged into the range, and microscopic automatic sighting can therefore be implemented.

As in the present embodiment, when L1, L2, and d are selected, the horizontal angle with respect to the linear line extending from the electrooptical distance-measuring device 1a to the target point 8a can be determined from the horizontal angle of the target point 8a detected through the macroscopic-position recognizing TV camera 5. In addition, the target point 8a can be included into the viewfield of the microscopic-automatic sighting TV camera 4, and the center of the target 8 can be aligned to the optical axis of the electrooptical distance-measuring device 1a.

FIG. 5 is a flowchart of a 3-D coordinate measuring procedure according to the present embodiment. First, the 3-D coordinate measuring apparatus is set so that all the target points 8a set onto the surface of the measurement target object 7 are included into the viewfield of the macroscopic-position recognizing TV camera 5.

Subsequently, calculations are performed to obtain the horizontal angle and the vertical angle of each of all the target points 8a captured by the macroscopic-position recognizing TV camera 5. The calculations are performed using the images captured by the TV camera 5. Thereafter, macroscopic-position recognition converts the angles into the horizontal angle and vertical angle with respect to the linear line extending from the electrooptical distance-measuring device 1a. Then, the image-processing-and-controlling personal computer 6 individually sets the horizontal angles and the vertical angles of the plurality of target points 8a to the motors 2 and 3 sequentially from, for example, that appearing upper left to that appearing lower right of the image captured by the macroscopic-position recognizing TV camera 5. Subsequently, the motors 2 and 3 are driven, the electrooptical distance-measuring device 1a is directed toward the target 8, and macroscopic automatic sighting is then carried out to include the target point 8a into the viewfield of the microscopic-automatic sighting TV camera 4. Then, the optical axis of the electrooptical distance-measuring device 1a is aligned to the center of the target 8 for the target point 8a in the viewfield of the microscopic-automatic sighting TV camera 4.

Subsequent to the alignment of the optical axis of the electrooptical distance-measuring device 1a to the center of the target 8, the electrooptical distance-measuring device 1a measures the linear distance to the target point 8a. Concurrently, the angle measuring device 1b measures the horizontal angle and the vertical angle of the electrooptical distance-measuring device 1a. Then, calculations are performed, and the 3-D coordinate of the target point 8a is obtained through the calculations. After completion of measurement of the one target point 8a, processes similar to the above are performed for the subsequent target point 8a. In this manner, all the target points 8a are measured, and the overall shape are measured.

As described above, according to the present embodiment, the plurality of target points 8a set on the overall surface of the measurement target object 7 are unidirectionally observed through the macroscopic-position recognizing TV camera 5. In this manner, the macroscopic position of the target point 8a is recognized. Then, the horizontal revolution drive motor 2 and the vertical revolution drive motor 3 are driven, and the optical axis of the electrooptical distance-measuring device 1a is thereby directed toward to one point or multiple points of the target point 8a. Consequently, the macroscopic automatic sighting can be carried out to approximately align the optical axis to the viewfield range of the microscopic automatic sighting.

From the fact that the macroscopic automatic sighting can thus be performed, the present embodiment enables the optical axis of the electrooptical distance-measuring device 1a to be aligned to the center of the target 8 in the microscopic automatic sighting substantially not requiring human operations. In this state, the electrooptical distance-measuring device 1a and the angle measuring device 1b measure the distance to the target point 8a and the horizontal angle and the vertical angle, and the 3-D coordinate of the target point 8a is calculated. In this manner, the coordinates of the plurality of target points 8a set onto the measurement target object 7 and the overall shape of the measurement target object 7 can be quickly measured substantially in an unmanned condition.

(Second Embodiment)

Figure 7:
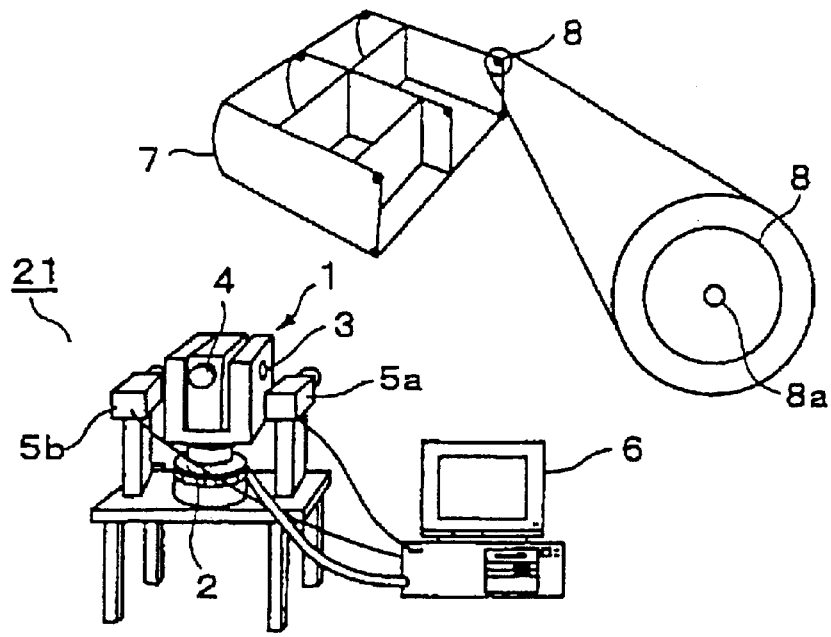
FIG. 7 shows an outline configuration of a large-structure 3-D coordinate measuring apparatus according to a second embodiment.
Figure 8:
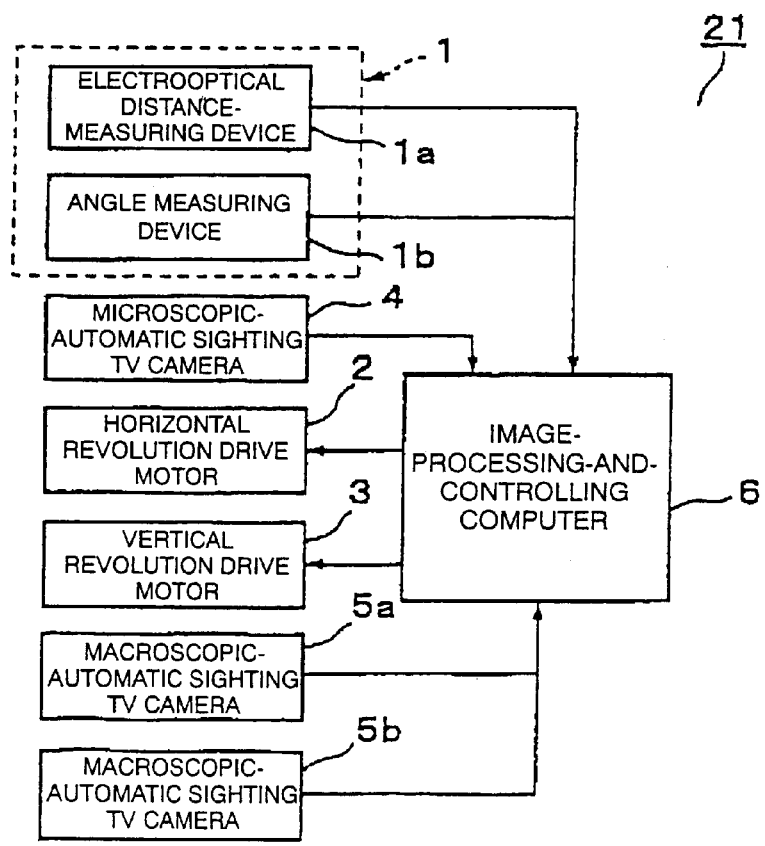
FIG. 8 is a block diagram showing a basis configuration of the 3-D coordinate measuring apparatus shown in FIG. 7.

FIG. 7 shows an outline configuration of a large-structure 3-D coordinate measuring apparatus according to a second embodiment. FIG. 8 is a block diagram showing a basic configuration of a 3-D coordinate measuring apparatus 21 shown in FIG. 7. In the figures, the same reference numerals/symbols refer to the same portions as those shown in FIGS. 1 and 2; and detailed descriptions of the same portions will be omitted herefrom.

Different from the above-described first embodiment, two macroscopic-position recognizing TV cameras 5a and 5b are provided in the second embodiment. More specifically, in the second embodiment, the two macroscopic-position recognizing TV cameras 5a and 5b are set in two sides of the microscopic-automatic sighting TV camera 4. In each of the macroscopic-position recognizing TV cameras 5a and 5b, the viewing angle is set to enable a plurality of targets 8 set on the overall surface of the measurement target object 7 to be observed. An image captured by each of the macroscopic-position recognizing TV cameras 5a and 5b is output to the image-processing-and-controlling personal computer 6. The image-processing-and-controlling personal computer 6 performs the image processing according to the input two images, and calculates the positions of the target points 8a in the images captured by the macroscopic-position recognizing TV cameras 5a and 5b. In this manner, the personal computer 6 performs macroscopic-position recognition.

The relative positions in each of macroscopic-position recognizing TV cameras 5a and 5b in the optical axes of the macroscopic-position recognizing TV camera 5, which has the viewfield including the overall measurement target object 7, and the electrooptical distance-measuring device 1a are preliminarily obtained at the time of fabrication. This enables the horizontal angle and vertical angle of the portion from the electrooptical distance-measuring device 1a to be calculated according to the position of the target point 8a detected by the macroscopic-position recognizing TV cameras 5a and 5b.

After the inclusion of the single target point 8a into the viewfield of the microscopic-automatic sighting TV camera 4, microscopic automatic sighting is carried out to align the center of the target 8 to the optical axis of the electrooptical distance-measuring device 1a. Subsequent to the alignment, the electrooptical distance-measuring device 1a measures the linear distance to the target point 8a. Concurrently, the angle measuring device 1b measures the horizontal angle and the vertical angle of the electrooptical distance-measuring device 1a. In this manner, the 3-D position of the target point 8a is automatically measured.

Figure 9:
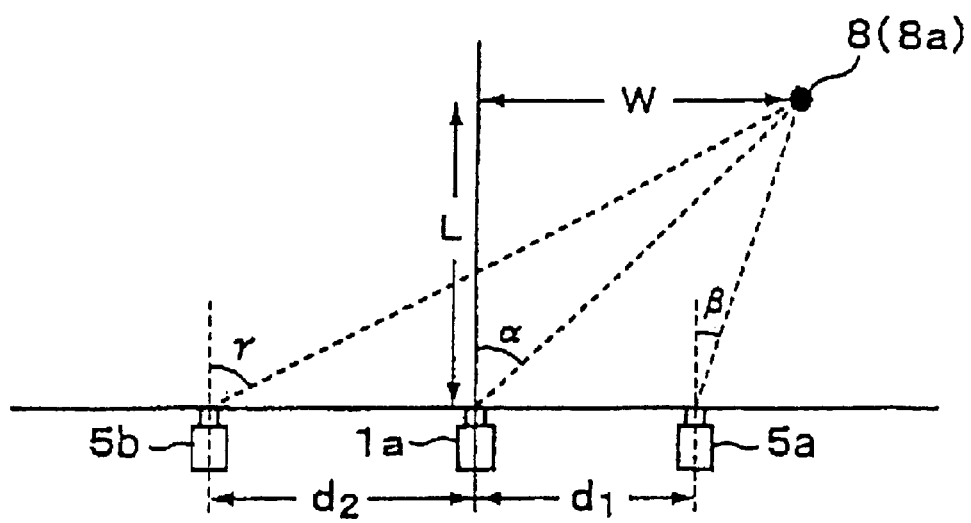
FIG. 9 shows the relationship between a horizontal angle of a target point recognized by two macroscopic-automatic sighting TV cameras and a horizontal angle with respect to the linear line extending from an electrooptical distance-measuring device to the target point.
Figure 10:
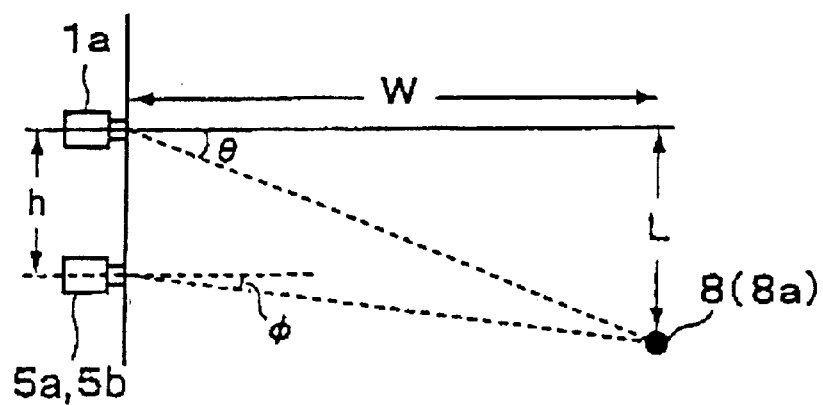
FIG. 10 shows the relationship between the position of a target point detected by two macroscopic-automatic sighting TV cameras and a vertical angle in the distance from an electrooptical distance-measuring device to the target point.

Hereinbelow, referring to FIGS. 9 and 10, a description will be provided regarding a method of calculating the horizontal angle and the vertical angle in the portion from the electrooptical distance-measuring device 1a to the target point 8a according to the position of the target 8 recognized by the two macroscopic-position recognizing TV cameras 5a and 5b, which individually include the overall measurement target object 7 into the viewfields. FIG. 9 shows the positional relationship among the electrooptical distance-measuring device 1a, the two macroscopic-position recognizing TV cameras 5a and 5b, and the target point 8a on a horizontal plane. FIG. 10 shows the positional relationship among the electrooptical distance-measuring device 1a, the two macroscopic-position recognizing TV cameras 5a and 5b, and the target 8 (target point 8a) in a vertical direction. In the vertical direction, the optical axes of the two macroscopic-position recognizing TV cameras 5a and 5b are set at the positions spaced away by respective distance d1 and d2 with respect to the optical axis of the electrooptical distance-measuring device 1a. In addition, in the vertical direction, the two TV cameras 5a and 5b are set away from the optical axis of the electrooptical distance-measuring device 1a at a distance h. Moreover, the two macroscopic-position recognizing TV cameras 5a and 5b are each set and immobilized not to be angularly changed by the motors 2 and 3. According to stereo 3-D vision, the macroscopic-position recognizing TV cameras 5a and 5b measure the positions from themselves to the target point 8a, and calculates a distance L to the target 8.

With the distance L having being calculated, the relationship among the horizontal angle α in the position from the electrooptical distance-measuring device 1a and horizontal angles β and γ with respect to the linear line extending from the respective two macroscopic-position recognizing TV cameras 5a and 5b are expressed by Formulas (9) and (10) shown below.

$$L[\tan(\alpha) - \tan(\beta)] = d1 \quad (9)$$

$$L[\tan(\gamma) - \tan(\alpha)] = d2 \quad (10)$$

According to Formulas (9) and (10), α is expressed by the following Formula (11):

$$\alpha = \tan^{-1}\{[d1 \tan(\alpha) + d2 \tan(\beta)]/(d1 + d2)\} \quad (11)$$

In addition, a target angle θ with respect to the linear line extending from the distance-measuring angle measuring device 1 in the vertical direction is expressed by the following Formula (12):

$$\theta = \tan^{-1}[\tan(\phi) + h/L] \quad (12)$$

The horizontal angle α and the vertical angle θ are set to the revolution drive motors 2 and 3 through the image-processing-and-controlling personal computer 6. Thereby, the electrooptical distance-measuring device 1a can be directed toward the target point 8a, and the single target point 8a can be included into the viewfield of the microscopic-automatic sighting TV camera 4.

Hereinbelow, referring to FIG. 11, a description will be provided regarding the following configuration. In the vertical direction, the optical axes of the macroscopic-position recognizing TV cameras 5a and 5b are set horizontal at the same height with respect to the center of the rotational axis of the electrooptical distance-measuring device 1a. Concurrently, in the horizontal direction, the macroscopic-position recognizing TV cameras 5a and 5b are set parallel to the horizontal-rotation reference axis in the position spaced away at a distance d from the left to right with respect to the center of the rotational axis of the electrooptical distance-measuring device 1a. In addition, the macroscopic-position recognizing TV cameras 5a and 5b are set and fixed not to be angularly changed by the motors 2 and 3.

Thus, since the vertical heights are the same, the vertical angle with respect to the linear line extending from the electrooptical distance-measuring device 1a to the target point 8a may be remained as the horizontal angle of the target point 8a in the macroscopic-position recognizing TV cameras 5a and 5b. As such, only the horizontal angle needs to be changed after the angle has been detected from the macroscopic-position recognizing TV cameras 5a and 5b.

Figure 11:
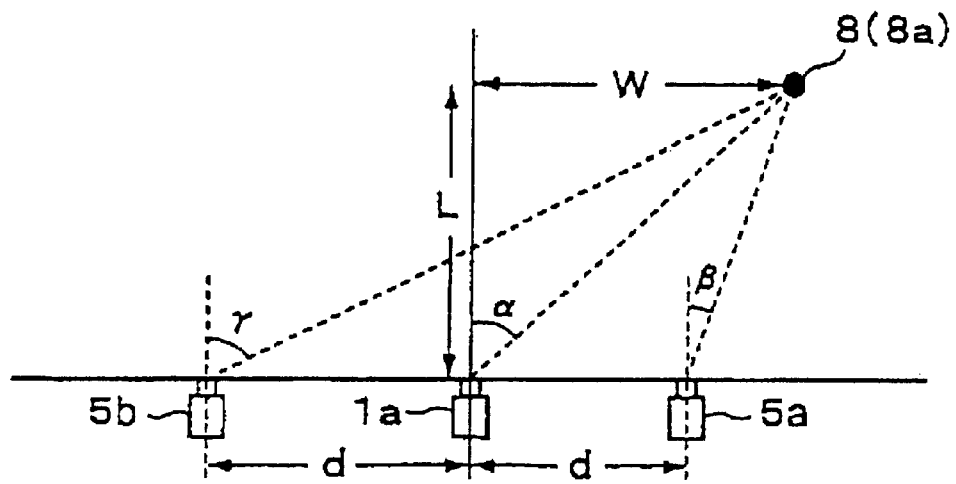
FIG. 11 shows the relationship between the position of a target point detected by two macroscopic-automatic sighting TV cameras and a vertical angle in the distance from an electrooptical distance-measuring device to the target point.

As shown in FIG. 11, when the target point 8a exists in a position W in the horizontal direction at a distance L from the electrooptical distance-measuring device 1a, the horizontal angle a with respect to the linear line extending from the electrooptical distance-measuring device 1a and the horizontal angles β and γ within the viewfield of the respective macroscopic-position recognizing TV cameras 5a and 5b are expressed by the following Formulas (13), (14), and (15):

$$\tan(\alpha) = W/L \quad (13)$$

$$\tan(\beta) = (W-d)/L \quad (14)$$

$$\tan(\gamma) = (W+d)/L \quad (15)$$

According to Formulas (13), (14), and (15), α is expressed by Formula (17) shown below.

Also, the vertical angle θ is expressed by Formula (17) shown below.

$$\alpha = \tan^{-1}\{[\tan(\alpha) + \tan(\beta)]/2\} \quad (16)$$

$$\theta = \phi \quad (17)$$

The horizontal angle α obtained in the above and the vertical angle θ=φ of the target point 8a detected by the macroscopic-position recognizing TV cameras 5a and 5b are set to the revolution drive motors 2 and 3 through the image-processing-and-controlling personal computer 6. Thereby, the electrooptical distance-measuring device 1a can be directed toward the target point 8a, and the single target point 8a can be included into the viewfield if the microscopic-automatic sighting TV camera 4.

In this case, dissimilar to the case described above, information on the distance to the target point 8a, which is to be measured by the macroscopic-position recognizing TV cameras 5a and 5b, is not necessary. In the present embodiment, the angle is determined from the angle in the direction from the macroscopic-position recognizing TV cameras 5a and 5b to the target point 8a.

In order to include the target point 8a into the viewfield of the microscopic-automatic sighting TV camera 4, detected-angle resolution in the two macroscopic-position recognizing TV cameras 5a and 5b needs to be higher than the resolution of the viewing angle of the microscopic-automatic sighting TV camera 4. For example, suppose measurement is performed from a distance of 10 m when the size of the measurement target object 7 is 30 mm. In this case, when the number of pixels of the macroscopic-position recognizing TV cameras 5a and 5b is 512 (pixels)×480 (number of pixels in the vertical column), the angle resolution is 0.14 degrees. When the viewing angle is, for example, 1.5 degrees, since it is sufficiently small, no problems will occur in the detection performance.

As in the configuration using the TV cameras 5a and 5b, according to a configuration using two or more macroscopic-position recognizing TV cameras, even when measurement is performed for the measurement target object 7 having an increased size with an increased range of distances at which individual target points 8a are set, the target points 8a can be accurately and securely included into the viewfield of the microscopic-automatic sighting TV camera 4.

In the present embodiment, the two macroscopic-position recognizing TV cameras 5a and 5b are used, and the TV cameras 5a and 5b are set at the same height as that of the center of the rotational axis of the optical axis of the electrooptical distance-measuring device 1a. However, in a case where the TV cameras 5a and 5b cannot be set at the same height as that of the center of the rotational axis, another TV camera can be set in the vertical direction with the optical axis of the electrooptical distance-measuring device 1a as the center. As such, the azimuth in the vertical direction can additionally be determined.

Figure 12:
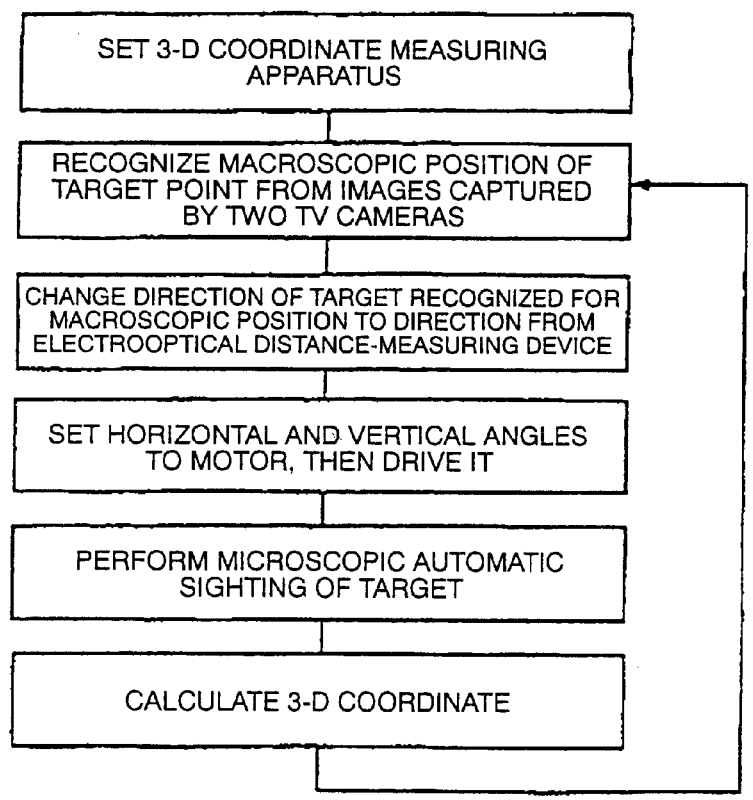
FIG. 12 is a flowchart of a 3-D coordinate measuring procedure according to the second embodiment.

FIG. 12 is a flowchart of a 3-D coordinate measuring procedure according to the present embodiment. First, the 3-D coordinate measuring apparatus is set so that all the target points 8a set onto the surface of the measurement target object 7 are included into the viewfields of the macroscopic-position recognizing TV cameras 5a and 5b.

Subsequently, calculations are performed to obtain the horizontal angle and the vertical angle of each of all the target points 8a captured by the two macroscopic-position recognizing TV cameras 5a and 5b. The calculations are performed using the images captured by the TV camera 5. Thereafter, macroscopic-position recognition converts the angles into the horizontal angle and vertical angle with respect to the linear line extending from the electrooptical distance-measuring device 1a. Then, the image-processing-and-controlling personal computer 6 individually sets the horizontal angles and the vertical angles of the plurality of target points 8a to the motors 2 and 3 sequentially from, for example, that appearing upper left to that appearing lower right of the image captured by the two macroscopic-position recognizing TV cameras 5a and 5b. Subsequently, the motors 2 and 3 are driven, the electrooptical distance-measuring device 1a is directed toward the target point 8a, and macroscopic automatic sighting is then carried out to include the target point 8a into the viewfield of the microscopic-automatic sighting TV camera 4. Then, the optical axis of the electrooptical distance-measuring device 1a is aligned to the center of the target 8 for the target point 8a in the viewfield of the microscopic-automatic sighting TV camera 4.

Subsequent to the alignment of the optical axis of the electrooptical distance-measuring device 1a to the center of the target 8, the electrooptical distance-measuring device 1a measures the linear distance to the target point 8a. Concurrently, the angle measuring device 1b measures the horizontal angle and the vertical angle of the electrooptical distance-measuring device 1a. Then, calculations are performed, and the 3-D coordinate of the target point 8a is obtained through the calculations. After completion of measurement of the one target point 8a, processes similar to the above are performed for the subsequent target point 8a. In this manner, all the target points 8a are measured, and the overall shape are measured.

As described above, according to the present embodiment, the plurality of target points 8a set on the overall surface of the measurement target object 7 are bidirectionally observed through the two macroscopic-position recognizing TV cameras 5a and 5b. In this manner, the macroscopic position of the target point 8a is recognized. Then, the horizontal revolution drive motor 2 and the vertical revolution drive motor 3 are driven, and the optical axis of the electrooptical distance-measuring device 1a is thereby directed toward to one point or multiple points of the target point 8a. Consequently, the macroscopic automatic sighting can be carried out to approximately align the optical axis to the viewfield range of the microscopic automatic sighting.

Because of the above-described arrangement, similar to the first embodiment, the present embodiment enables the optical axis of the electrooptical distance-measuring device 1a to be aligned to the center of the target 8 in the microscopic automatic sighting substantially not requiring human operations. In this state, the distance-measuring angle measuring device 1 performs measurement of the target point 8a, and the 3-D coordinate of the target point 8a is calculated. As such, the coordinates of the plurality of target points 8a set onto the measurement target object 7 and the overall shape of the measurement target object 7 can be quickly measured substantially in an unmanned condition.

Furthermore, since the present embodiment uses the macroscopic-position recognizing TV cameras 5a and 5b, even when measuring a measurement target object 7 having an increased size is measured with a range of distances at which the target point 8a are set. For example, even in the range of distances that is increased to a range of from 5 to 30 m with respect to a range of from 10 to 30 m, the present embodiment is capable of accurately and securely including the macroscopic positions of the individual target points 8a into the viewfield of the microscopic-automatic sighting TV camera 4. The present embodiment can of course handle a case, without causing problems, in which the viewfield of the microscopic-automatic sighting TV camera 4 is reduced to enhance the accuracy of the microscopic sighting.

(Third Embodiment)

Figure 14:
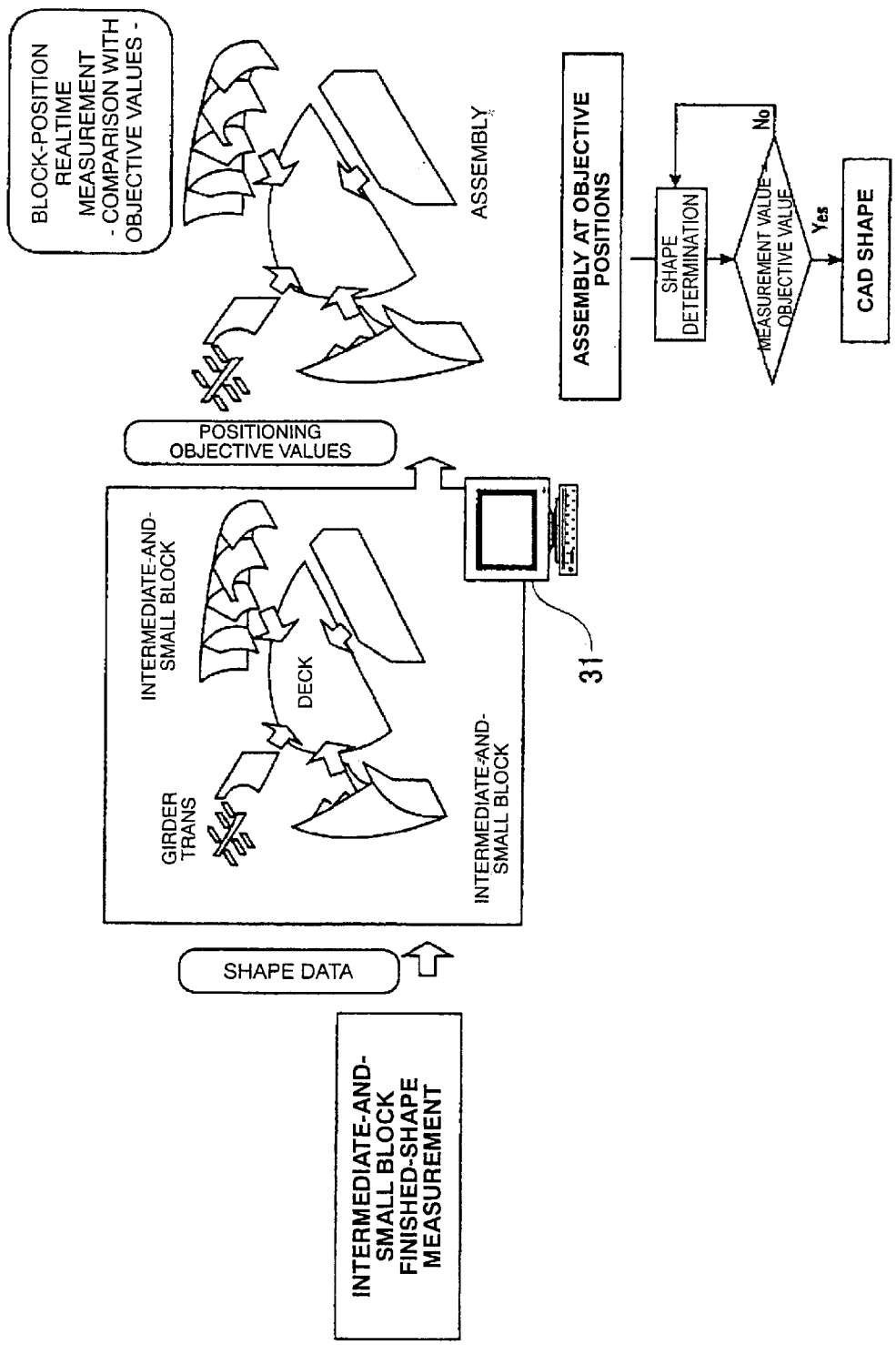
FIG. 14 shows an outline procedure of a large-structure building method according to a third embodiment.
Figure 17:
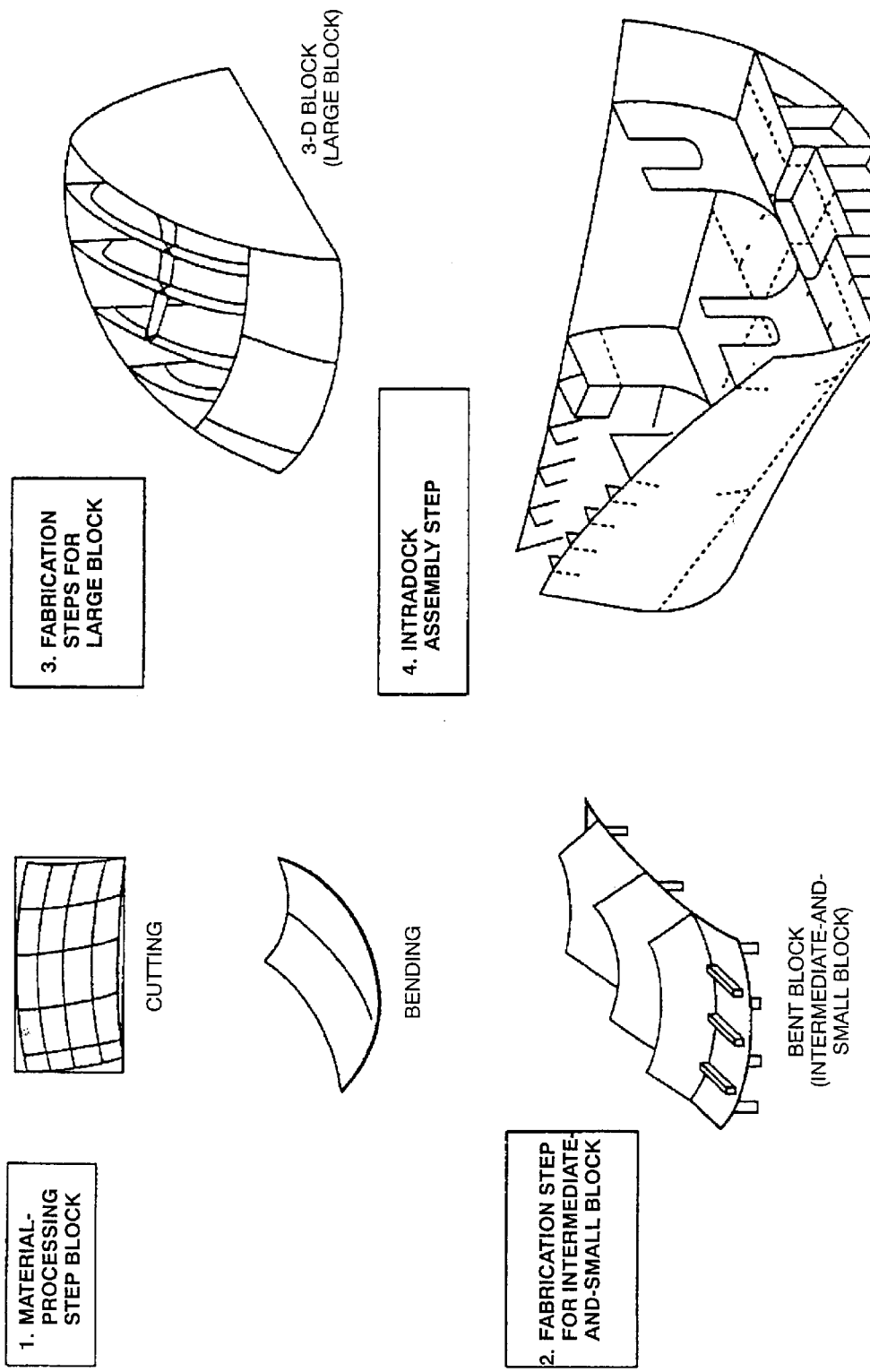
FIG. 17 shows an outline procedure of a shipbuilding method employing a block-based fabrication method.

FIG. 14 shows an outline procedure of a large-structure building method according to a third embodiment;

The large-structure building method uses the 3-D coordinate measuring apparatus one of the first and second embodiments. As such, a description regarding the 3-D coordinate measuring apparatus will be omitted herefrom. In specific, the large-structure building method of this embodiment will be described with reference to an example shipbuilding method employing a block-based fabrication method as shown in FIG. 17.

Referring to FIG. 14, in an intermediate-and-small block fabricating step of the shipbuilding method, the 3-D coordinate measuring apparatus performs high-speed and high-accuracy measurement of, for example, the shapes and the dimensions of intermediate-and-small blocks, and inputs data regarding the shapes (shape data) to an objective-value calculating computer 31.

FIG. 15 shows a state where the shapes of intermediate-and-small blocks are measured; and the results are input to the objective-value calculating computer 31, and are processed by the target-value calculating computer 31.

Upon receipt of all the necessary shape data of the intermediate-and-small blocks for fabricating a large block, the objective-value calculating computer 31 performs calculations. The calculations are performed according to the shape data including precision-related information regarding the intermediate-and-small block and CAD shape information that is used as an objective in a large-block fabrication step. More specifically, the objective-value calculating computer 31 performs calculations to provide information regarding the disposition positions and altitudes of the individual intermediate-and-small blocks for assembly and fabrication of a large block having a shape that is most similar to the desired shape of the large block. As a result, the objective-value calculating computer 31 outputs positioning objective values representing positioning points of the individual intermediate-and-small blocks for the assembly of the large block. When an intermediate-and-small block is determined to lack precision for fabricating the intended large block, the objective-value value calculating computer 31 outputs a report about it to enable correction to be performed.

The positioning objective values representing the positioning points are input to a positioning computer 32. Then, the large-block fabrication step is started.

Figure 16:
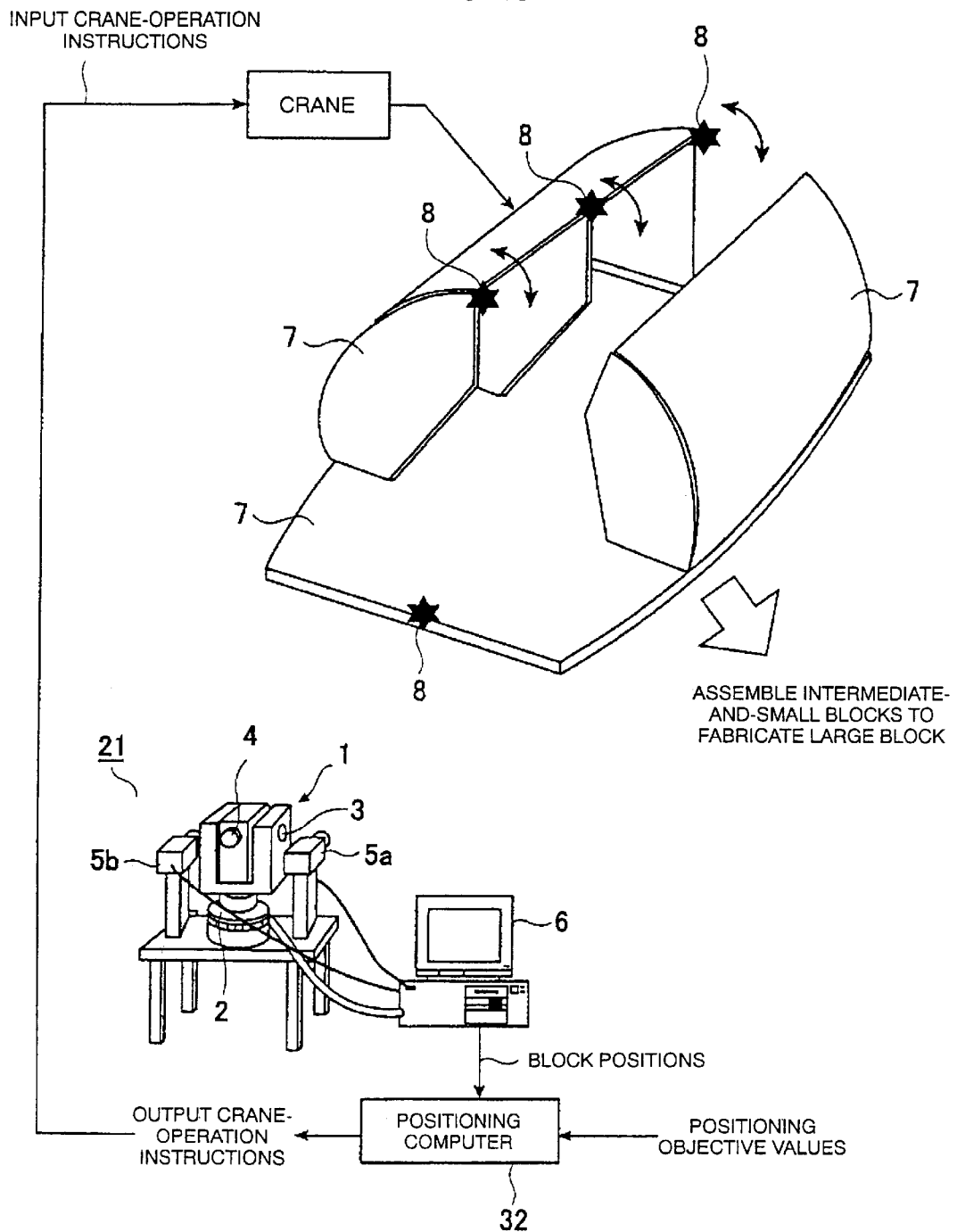
FIG. 16 shows a large-block fabrication step where the block position and altitude are measured in real time, and concurrently, blocks are assembled.

FIG. 16 shows a large-block fabrication step where the block position and altitude are measured in real time, and concurrently, blocks are assembled.

As shown in FIGS. 14 and 16, a plurality of targets 8 provided at positioning points on the intermediate-and-small block and the like are measured in real time. As such, the positions and the altitudes of the individual blocks are automatically and quickly measured to produce measurement values as positional information. The measurement values are then input to the positioning computer 32, and are then compared with the positioning objective values representing the individual positioning points. As a result, the positioning computer 32 outputs an instruction value (for the subsequent positioning) representing crane-operation instructions. In response to the crane instruction output, the subsequent crane operation is executed, and the positions and altitudes of the intermediate-and-small blocks are modified.

According to the modification in the positions and altitudes, the positional measurement of positioning points on the individual blocks are executed again in real time, and above-described processes are iterated. When the positions of the individual positioning points are found within a specific error range preset with respect to the positioning objective values, the shapes conform to the CAD shapes, and the assembly is completed. Thus, according to the method of the present embodiment, the block positions and altitudes are automatically measured in real time, the measurement values representing the block positions and altitudes are compared with the objective values, and concurrently, correction is performed. In this manner, the individual blocks are assembled to have the virtual CAD shape.

The positioning computer 32 in the present embodiment is assumed to operate in the case where either instructions for crane operation or positional information for crane operation are output, and the crane operation is subsequently performed according to operator operation. However, the present invention is not limited by the above case. For example, the arrangement may be such that the output information of the positioning computer 32 is directly input to a crane control device, and measurement values are and objective values are automatically controlled to conform to each other. As another aspect, the present embodiment has been described with reference to the case where discrete computers are used for the image-processing-and-controlling personal computer 6, the objective-value calculating computer 31, and the positioning computer 32. However, functions of these computers may appropriately be structured using one computer or two or more computers.

As described above, the present embodiment enables high-speed and high-precision automatic measurement to be implemented to measure the positions of a plurality of reflecting targets set on a component member. In addition, the present embodiment enables component members to be assembled with high efficiency and high precision by using the results of the aforementioned measurement.

According to the present embodiment, the block fabrication is implemented according to the procedure in which the shape control is performed such that the block positions and altitudes are measured in real time as the positioning points (target-set points), the positions are compared with the positioning objective values, and the blocks are fabricated (this method is called a shape feedback method). In the present embodiment, the above-described procedure is applied to the large-block fabrication step in the present embodiment. As such, the large-block fabrication time can significantly be reduced. The shape feedback method can be applied also to an intermediate-and-small block fabricating step or an intradock assembly step.

When the block shape is accurately measured, the degree of correction in the subsequent step can be reduced as an advantage. This advantage contributes to the improvement in efficiency of the overall shipbuilding steps. Moreover, the aforementioned manner can be applied not only to the process between the intermediate-and-small block fabricating step and the large-block fabrication step, but also to various other interstep processes.

As above, the present invention has been described with reference to the case where the above-described techniques are applied to the building method. However, the present invention may be applied to various other building methods for large structures such as civil works and buildings. In the description regarding the shipbuilding, blocks have been referred to for the measurement target objects 7. However, depending on the application object of the building method, for example, other component members or components are used instead of the blocks.

The present invention is not limited by the above-described embodiments. In the individual embodiments described above, the macroscopic-position recognizing TV cameras 5, or 5a and 5b are set coaxially with the optical axis of the electrooptical distance-measuring device 1a, and an image(s) captured by the macroscopic-position recognizing TV cameras 5, or 5a and 5b is subjected to the image-processing, and central positions of the individual targets 8 are detected in the processing. However, the central positions of the individual targets 8 may be detected using a 2-D position detecting device, such as a position-sensitive detector (PSD) that is capable of detecting centroidal positions of the individual targets 8.

Suppose the viewfield range of each of the macroscopic-position recognizing TV cameras 5, 5a, and 5b is narrow with respect to the overall measurement target object 7, and the overall measurement target object 7 cannot be viewed at one time. In this case, the arrangement may be such that macroscopic-position recognizing TV cameras 5, or 5a and 5b are mounted on the revolution drive motor 2 or 3, and the viewfield range is moved according to the rotation of the revolution drive motors 2 or 3. Thereby, the viewfield of each of the macroscopic-position recognizing TV cameras 5, 5a, and 5b is enlarged in the horizontal direction or the vertical direction. This arrangement enables the measurement of the individual target points 8a on the overall surface of the measurement target object 7.

Figure 13:
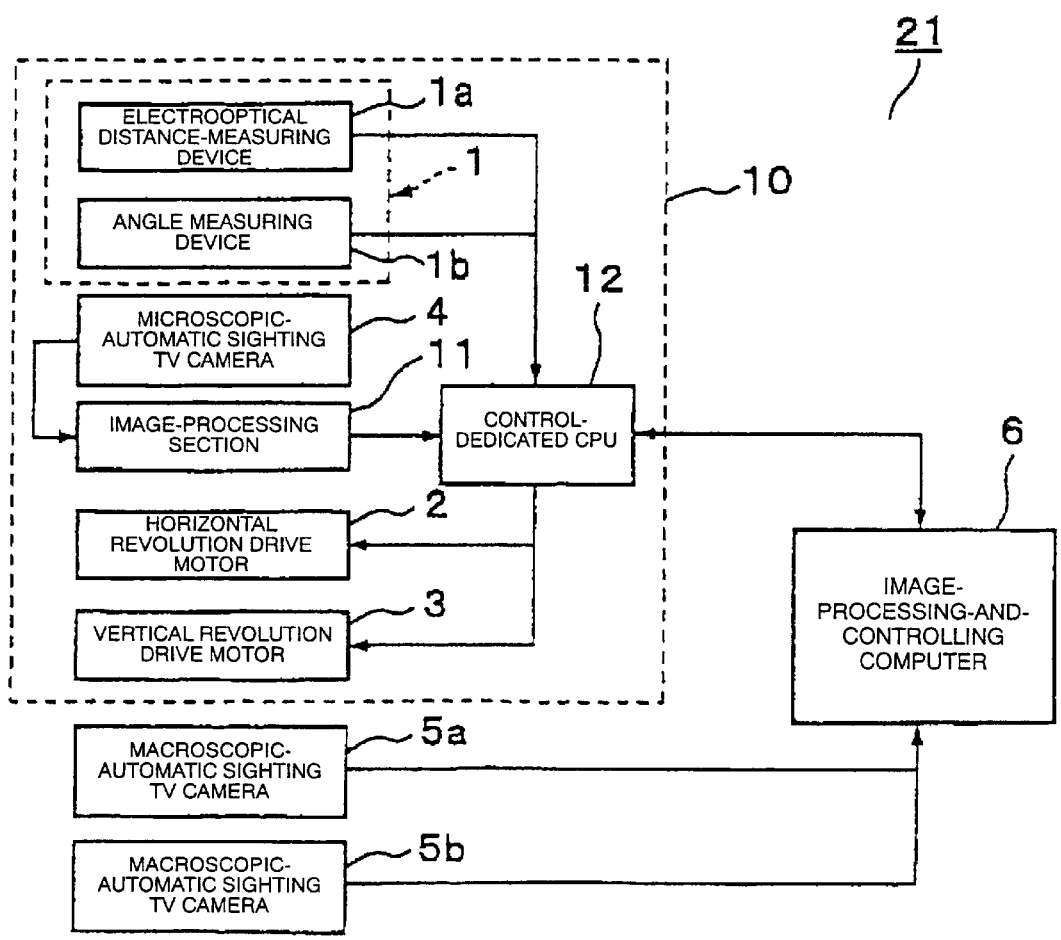
FIG. 13 is a block diagram of a configuration using a measuring mechanism capable of microscopic automatic sighting according to the second embodiment.

In each of the embodiments, the image-processing-and-controlling personal computer 6 is used to control the motor driving and to process the image sent through the video signal of each of the macroscopic-position recognizing TV cameras 5, 5a, and 5b set coaxial with the optical axis of the electrooptical distance-measuring device 1a. However, as shown in FIGS. 6 and 13, the configuration may be arranged to use a measuring unit 10 (total station) including an image-processing section and capable of performing automatic sighting. In this configuration, the image-processing-and-controlling personal computer 6 controls a control-dedicated CPU 12 mounted into the measuring unit 10 through a command or the like to thereby implement the control of the microscopic automatic sighting and the driving motor.

What is claimed is:

1. A three-dimensional (3-D) coordinate measuring method wherein:

an electrooptical distance-measuring device is used to measure a linear distance to a coordinate-measurement target point set on a surface of a measurement target object;

an angle measuring device is used to measure shifted angles of an optical axis of the electrooptical distance-measuring device; and and a 3-D coordinate of the target point is measured according to a measured distance and a measured angle after the optical axis of the electrooptical distance-measuring device has been aligned to the target point set on the surface of the measurement target object, the 3-D coordinate measuring method comprising:

a coordinate recognizing step for observing a plurality of targets on the overall surface of the measurement target object through an image capturing means, recognizing a plurality of target points on the surface of the measurement by processing obtained images, and calculating approximate 3-D coordinates of the target points;

a macroscopic sighting step for approximate aligning the optical axis of the electrooptical distance-measuring device so that one of the target points recognized by the coordinate recognizing step is included into a predetermined viewfield range; and a microscopic sighting step for aligning the optical axis of the electrooptical distance-measuring device, which has been approximately aligned at the macroscopic sighting step, to the one of the target points in the predetermined viewfield range.

2. The 3-D coordinate measuring method of claim 1, wherein the macroscopic sighting step and the microscopic sighting step are repeatedly performed until all the 3-D coordinates of the individual target points recognized at the coordinate recognizing step are automatically measured.

3. The 3-D coordinate measuring method of claim 1, wherein the image capturing means comprises one or more image capturing devices of which optical axes include at least one optical axis misaligning with the optical axis of the electrooptical distance-measuring device.

4. The 3-D coordinate measuring method of claim 3, wherein the image capturing means observe the plurality of targets on the overall surface of the measurement target object from at least two directions.

5. The 3-D coordinate measuring method of claim 4, wherein the coordinate recognizing step comprises steps of:

recognizing the plurality of target points on the surface of the measurement target object according to a trigonometrical survey method by using two or more images obtained through two or more image capturing devices; and calculating approximate 3-D coordinates of the target points.

6. The 3-D coordinate measuring method of claim 5, wherein the coordinate recognizing step uses stereo 3-D vision for the trigonometrical survey method.

7. A 3-D coordinate measuring method using an apparatus comprising:

an electrooptical distance-measuring device for measuring a linear distance to a coordinate-measurement target point set on a surface of a measurement target object;

optical-axis driving means for causing the direction of an optical axis of the electrooptical distance-measuring device to be variable along a horizontal direction and a vertical direction;

optical-axis-angle measuring means for measuring a horizontal angle and a vertical angle of the optical axis of the electrooptical distance-measuring device;

microscopic automatic sighting means for using the optical-axis driving means to align the optical axis of the electrooptical distance-measuring device to the target point in a predetermined viewfield in the vicinity of one target point set on the surface of the measurement target object;

image capturing means for unidirectionally observing a plurality of targets set on the overall surface of the measurement target object;

macroscopic-position recognizing means for processing an image obtained by the image capturing means, thereby recognizing a plurality of target points on the surface of the measurement target object, and calculating approximate 3-D coordinates of the target points; and macroscopic automatic sighting means for approximately aligning the optical axis of the electrooptical distance-measuring device so that one of the target points recognized by the macroscopic-position recognizing means is included into the predetermined viewfield, the 3-D coordinate measuring method comprising the steps of:

controlling the macroscopic automatic sighting means to approximately align the optical axis of the electrooptical distance-measuring device to the vicinity of the one target point set on the measurement target object;

controlling the microscopic automatic sighting means to align the optical axis of the electrooptical distance-measuring device to the target point; and controlling the apparatus to calculate a 3-D coordinate of the target point by using the results of measurement performed by the electrooptical distance-measuring device and the optical-axis-angle measuring means.

8. A 3-D coordinate measuring apparatus comprising:

an electrooptical distance-measuring device for measuring a linear distance to a coordinate-measurement target point set on a surface of a measurement target object;

an optical-axis driving mechanism to which the electrooptical distance-measuring device is mounted and that rotates on two different axes as the centers to cause the direction of an optical axis of the electrooptical distance-measuring device to be variable along a horizontal direction and a vertical direction;

an optical-axis-angle measuring device for measuring the optical-axis angle of the electrooptical distance-measuring device;

a microscopic automatic sighting mechanism for using the optical-axis driving mechanism to align the optical axis of the electrooptical distance-measuring device to the target point in a predetermined viewfield for one target point on the surface of the measurement target object;

an image capturing mechanism for observing a plurality of targets set on the overall surface of the measurement target object;

a macroscopic-position recognizing means for processing an image obtained by the image capturing mechanism, thereby recognizing a plurality of target points on the surface of the measurement target object, and calculating approximate 3-D coordinates of the target points;

a macroscopic automatic sighting mechanism for approximately aligning the optical axis of the electrooptical distance-measuring device so that one of the target points recognized by the macroscopic-position recognizing means is included into the predetermined viewfield;

sight control means for using the macroscopic automatic sighting mechanism to align the optical axis to a target point, which has been approximately aligned into the predetermined viewfield of the electrooptical distance-measuring device, of the one target set on the measurement target object and that has been recognized by the macroscopic automatic sighting mechanism; and coordinate calculating means for calculating a 3-D coordinate of the target point by using the results of measurement performed by the electrooptical distance-measuring device and the optical-axis-angle measuring means.

9. The 3-D coordinate measuring apparatus of claim 8, wherein until all the 3-D coordinates of the target points recognized by the macroscopic-position recognizing means are measured, the macroscopic automatic sighting mechanism and the sight control means repeatedly perform the processing; or alternatively, the macroscopic automatic sighting mechanism, the sight control means, and the coordinate calculating means repeatedly perform the processing.

10. The 3-D coordinate measuring apparatus of claim 8, wherein the image capturing mechanism comprises one or more image capturing devices of which optical axes include at least one optical axis misaligning with the optical axis of the electrooptical distance-measuring device.

11. The 3-D coordinate measuring apparatus of claim 8, wherein the image capturing mechanisms observe the plurality of targets on the overall surface of the measurement target object from at least two directions.

12. The 3-D coordinate measuring apparatus of claim 11, wherein the macroscopic-position recognizing means performs the steps of:

recognizing the plurality of target points on the surface of the measurement target object according to a trigonometrical survey method; and calculating approximate 3-D coordinates of the target points.

13. The 3-D coordinate measuring apparatus of claim 8, wherein the macroscopic automatic sighting mechanism changes an appropriate direction of the target to a direction from the electrooptical distance-measuring device and, directs the optical axis of the electrooptical distance-measuring device to the direction of the target point according to the approximate 3-D coordinate of the target point and the positional relationship between the optical axis of the image capturing mechanism, which observes the targets set on the surface of the measurement target object, and the optical axis of the electrooptical distance-measuring device.

14. The 3-D coordinate measuring apparatus of claim 8, wherein the image capturing mechanism is mounted to a horizontal rotation portion of the two axes of the optical-axis driving mechanism, and rotates together with the electrooptical distance-measuring device.

15. The 3-D coordinate measuring apparatus of claim 14, wherein:

the image capturing mechanism is immobilized at a predetermined height in a vertical direction; and the plurality of targets set on the overall surface of the measurement target object are unidirectionally observed.

16. The 3-D coordinate measuring apparatus of claim 11, wherein the image capturing mechanism is mounted to a horizontal rotation portion of the two optical axes of the optical-axis driving mechanism, and rotates together with the electrooptical distance-measuring device.

17. The 3-D coordinate measuring apparatus of claim 16, wherein the plurality of targets set on the overall surface of the measurement target object are bidirectionally observed by at least a pair of the image capturing mechanisms immobilized at positions spaced away at same distances from horizontal rotation axes in the horizontal direction at same heights in the vertical direction.

18. A 3-D coordinate measuring apparatus wherein individual 3-D coordinates corresponding to a plurality of coordinate-measurement target points set on a measurement target object are calculated by using distance measurement values of an electrooptical distance-measuring device with respect to the individual target points and information on the angle of an optical axis of the electrooptical distance-measuring device, the 3-D coordinate measuring apparatus comprising:

an image capturing mechanism for observing targets individually having the plurality of target points set on the measurement target object;

a macroscopic-position recognizing means for processing an image obtained by the image capturing mechanism, thereby recognizing the plurality of target points set on the surface of the measurement target object, and calculating approximate 3-D coordinates of the target points;

a macroscopic automatic sighting mechanism for approximately aligning the optical axis of the electrooptical distance-measuring device according to the approximate 3-D coordinates so that certain one of the target points recognized by the macroscopic-position recognizing means is included into a predetermined viewfield range;

a microscopic automatic sighting mechanism for aligning the optical axis of the electrooptical distance-measuring device, which has been approximately aligned by the macroscopic automatic sighting mechanism, to the certain one of the target points in a predetermined viewfield range; and a control means for controlling the macroscopic automatic sighting mechanism and the microscopic automatic sighting mechanism to repeatedly perform the processing until the distance measurement values of the electrooptical distance-measuring device and the information on the angle of optical axis of the electrooptical distance-measuring device are obtained.

19. A large-structure building method wherein:

a plurality of first component members of one or more types are assembled, and a second component member is thereby fabricated;

a plurality of the second component members of one or more types are assembled, and a third component member is thereby fabricated;

similarly, a plurality of n-th component members of one or more types are assembled, and an (n+1)-th component member are thereby fabricated; and one of an intermediate structure and a final structure is thereby fabricated, the large-structure building method comprising:

a measuring step for automatically measuring real shapes of the n-th component members in a manner that calculating individual 3-D coordinates corresponding to a plurality of coordinate-measurement target points set on the n-th component members are calculated according to distance measurement values of an electrooptical distance-measuring device and information on the angle of an optical axis of the electrooptical distance-measuring device; and an evaluating step that evaluates assembly precision of the (n+1)-th component member according to the real shape measured at the measuring step and that issues an instruction for use of only n-th component members usable for assembly of the (n+1)-th component member, to obtain the distance measurement values of the electrooptical distance-measuring device and information on the angle of the optical axis of the electrooptical distance-measuring device, the measuring step further comprising:
- a coordinate recognizing step that uses image capturing means to observe targets including a plurality of target points set on the n-th component member and that processes obtained images and thereby recognizes approximate 3-D coordinates corresponding to the plurality of target points set on the n-th component member;
- a macroscopic sighting step for approximate aligning the optical axis of the electrooptical distance-measuring device by using the approximate 3-D coordinates so that certain one of the target points recognized by the coordinate recognizing step is included into a predetermined viewfield range;
- a microscopic sighting step for aligning the optical axis of the electrooptical distance-measuring device, which has been approximately aligned at the macroscopic sighting step, to the certain one of the target points in the predetermined viewfield range; and
- a step of repeatedly performing the macroscopic sighting step and the microscopic sighting step until the distance measurement value of the electrooptical distance-measuring device and Information on the angle of the optical axis of the electrooptical distance-measuring device are obtained for all the target points.

20. The large-structure building method of claim 19, wherein the image capturing means comprises one or more image capturing cameras of which optical axes include at least one optical axis misaligning with the optical axis of the electrooptical distance-measuring device.

21. The large-structure building method of claim 19, large structure is one of a ship, a bridge, a civil work, and building.

22. A large-structure building method for fabricating one of an intermediate structure and a final structure by assembling a plurality of component members of one or more types, comprising:
   an objective determining step for feeding positioning objective values for the individual component members when being assembled to fabricate the structure;
   a measuring step for automatically measuring target points of the component members in a manner that calculating individual 3-D coordinates corresponding to a plurality of target points set on the component members are calculated according to distance measurement values of an electrooptical distance-measuring device and information on the angle of an optical axis of the electrooptical distance-measuring device; and
   a component-member correcting step for correcting the position of a component member according to the result of a comparison between the 3-D coordinates and the positioning objective values of the target points so that a new 3-D coordinate of a target point conforms or becomes proximity to the positioning objective values, to obtain the distance measurement values of the electrooptical distance-measuring device and information on the angle of the optical axis of the electrooptical distance-measuring device, the measuring step further comprising:
- a coordinate recognizing step that uses image capturing means to observe targets including a plurality of target points set on the component member and that processes obtained images and thereby recognizes approximate 3-D coordinates corresponding to the plurality of target points set on the component member;
- a macroscopic sighting step for approximate aligning the optical axis of the electrooptical distance-measuring device by using the approximate 3-D coordinates so that certain one of the target points recognized by the coordinate recognizing step is included into a predetermined viewfield range;
- a microscopic sighting step for aligning the optical axis of the electrooptical distance-measuring device, which has been approximately aligned at the macroscopic sighting step, to the certain one of the target points in the predetermined viewfield range; and
- a step of repeatedly performing the macroscopic sighting step and the microscopic sighting step until the distance measurement value of the electrooptical distance-measuring device and information on the angle of the optical axis of the electrooptical distance-measuring device are obtained for all the target points.

23. The large-structure building method of claim 22, wherein the image capturing means comprises one or more image capturing cameras of which optical axes include at least one optical axis misaligning with the optical axis of the electrooptical distance-measuring device.

24. The large-structure building method of claim 22, the large structure is one of a ship, a bridge, a civil work, and building.

* * * * *